United States Patent
Tin

(10) Patent No.: US 11,758,286 B1
(45) Date of Patent: Sep. 12, 2023

(54) METHOD AND ELECTRONIC DEVICE OF CORRECTING FRAME FOR OPTICAL CAMERA COMMUNICATION

(71) Applicant: Wistron Corporation, New Taipei (TW)

(72) Inventor: Hsiao-Wen Tin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/853,864

(22) Filed: Jun. 29, 2022

(30) Foreign Application Priority Data

Apr. 28, 2022 (TW) .................................. 111116268

(51) Int. Cl.
*H04N 23/80* (2023.01)
*H04N 23/617* (2023.01)

(52) U.S. Cl.
CPC ........... *H04N 23/80* (2023.01); *H04N 23/617* (2023.01)

(58) Field of Classification Search
CPC .. H04N 23/80; H04N 23/617; H04Q 11/0478; G16H 20/00; G06V 10/764
See application file for complete search history.

(56) References Cited

U.S. PATENT DOCUMENTS

| | | | |
|---|---|---|---|
| 5,526,362 A * | 6/1996 | Thompson | H04Q 11/0478 375/376 |
| 2018/0103913 A1* | 4/2018 | Tzvieli | G06V 10/462 |
| 2020/0193998 A1* | 6/2020 | Abou Antoun | G06V 10/764 |
| 2021/0211575 A1* | 7/2021 | Grant | H04N 23/951 |
| 2022/0152936 A1 | 5/2022 | Luan et al. | |
| 2023/0033102 A1* | 2/2023 | Gorski | G06Q 50/10 |
| 2023/0052573 A1* | 2/2023 | Gnanasambandam | G16H 20/00 |

FOREIGN PATENT DOCUMENTS

| | | |
|---|---|---|
| CN | 114005016 | 2/2022 |
| CN | 114359430 | 4/2022 |
| WO | 2021021153 | 2/2021 |

OTHER PUBLICATIONS

"Office Action of Taiwan Counterpart Application", dated Feb. 24, 2023, p. 1-p. 9.

* cited by examiner

*Primary Examiner* — Hung H Lam
(74) *Attorney, Agent, or Firm* — JCIPRNET

(57) ABSTRACT

A method and an electronic device of correcting frame for an optical camera communication (OCC) are provided. The method includes the following steps. The optical signal is captured. The optical signal is input to a first machine learning (ML) model to obtain a missing timestamp. The optical signal and the missing timestamp are input to a second ML model to obtain a first complement frame corresponding to the missing timestamp. The first complement frame is outputted.

20 Claims, 5 Drawing Sheets

1

METHOD AND ELECTRONIC DEVICE OF CORRECTING FRAME FOR OPTICAL CAMERA COMMUNICATION

CROSS-REFERENCE TO RELATED APPLICATION

This application claims the priority benefit of Taiwan application serial no. 111116268, filed on Apr. 28, 2022. The entirety of the above-mentioned patent application is hereby incorporated by reference herein and made a part of this specification.

BACKGROUND

Field of the Disclosure

The present disclosure relates to an optical communication technology, and more particularly, to a method and an electronic device of correcting frames for optical camera communication (OCC).

Description of Related Art

Internet of Things (IoT) devices adopt various wireless communication technologies for communication, and these technologies have different advantages and disadvantages and applicable scenarios. With the rapid increase in the number of IoT devices, optical communication technology with high bandwidth has become a feasible solution for IoT device communication. OCC technology is a completely software-based solution that is extremely compatible with existing infrastructure such as commercial cameras or lighting equipment. Therefore, OCC technology is a very potential solution for IoT device communication. The receiver of the OCC system may utilize the camera to capture the optical signal emitted by the transmitter (e.g., IoT device) to obtain the data to be transmitted by the transmitter.

In order to improve the efficiency of data transmission, the transmitter of the OCC system may transmit optical signals with a higher frequency. However, the sampling frame rate of the camera may be floating or skewed over time. When the sampling frame rate of the camera changes, resulting in asynchrony between the camera and the transmitter, the receiver will not be able to receive the complete optical signal. As a result, there are missing frames in the received optical signal. Therefore, how to solve the problem of missing frames that often occur in the OCC system is one of the issues to be solved by practitioners of the field.

SUMMARY OF THE DISCLOSURE

The present disclosure provides a method and an electronic device of correcting frames for optical camera communication, which may solve the communication asynchrony caused by the floating of the sampling frame rate of the camera.

An embodiment of the present disclosure discloses an electronic device of correcting frames for optical camera communication, including a processor, a storage medium, a transceiver, and a capturing device. The capturing device is configured to capture the optical signal. The storage medium is configured to store a plurality of machine learning models including a first machine learning model and a second machine learning model. The processor is coupled to the storage medium, the transceiver, and the capturing device, and the processor is configured to: input the optical signal to the first machine learning model to obtain a missing timestamp; input the optical signal and the missing timestamp to the second machine learning model to obtain a first complement frame corresponding to the missing timestamp; and output the first complement frame through the transceiver.

An implementation of the present disclosure discloses a method of correcting frames for optical camera communication, including: capturing an optical signal; inputting the optical signal into a first machine learning model to obtain a missing timestamp; inputting the optical signal and the missing timestamp to a second machine learning model to obtain a first complement frame corresponding to the missing timestamp; and outputting the first complement frame.

Based on the above, the electronic device of the present disclosure may predict whether there is a missing frame in the optical signal of the IoT device based on a machine learning algorithm and complement frames for the optical signal when there is a missing frame in the optical signal. In this way, the defect of the optical signal caused by asynchrony between the camera and the IoT device may be avoided.

DESCRIPTION OF EMBODIMENTS

Figure 1:
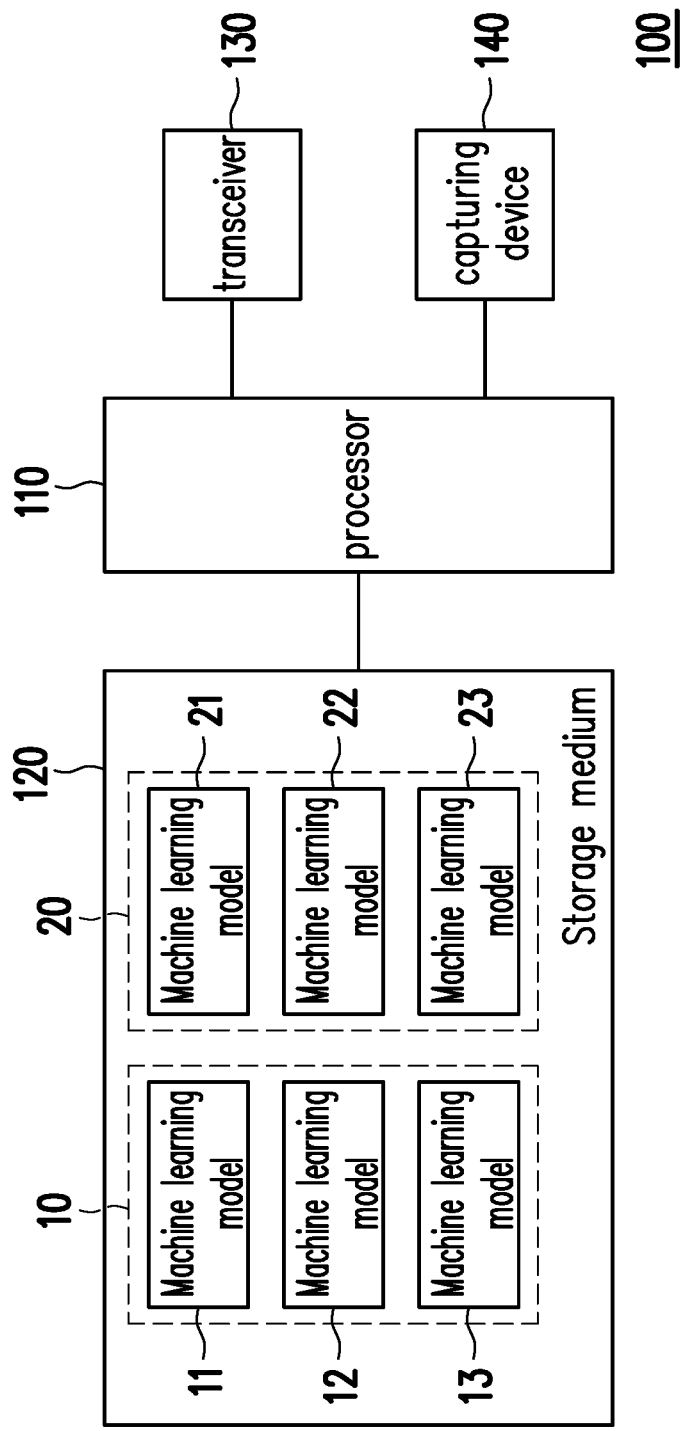
FIG. 1 is a schematic view of an electronic device of correcting frames for optical camera communication according to an embodiment of the present disclosure.

In order to make the content of the present disclosure more comprehensible, the following specific embodiments are given as examples by which the present disclosure may indeed be implemented. Additionally, where possible, elements/components/steps using the same reference numerals in the drawings and embodiments represent the same or similar parts.

FIG. 1 is a schematic view of an electronic device 100 of correcting frames for optical camera communication according to an embodiment of the present disclosure. The electronic device 100 may include a processor 110, a storage medium 120, a transceiver 130, and a capturing device 140. The electronic device 100 may receive an optical signal emitted by an external device, such as an IoT device with a light source such as a set-top box, a remote controller, or a wireless access point and correct missing frames for the optical signal.

The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements or a combination of the above elements. The processor 110 may be coupled to the storage medium 120, the transceiver 130, and the capturing device 140, and access and execute a plurality of modules and various application programs stored in the storage medium 120.

The storage medium 120 is, for example, any type of fixed or removable random access memory (RAM), read-only memory (ROM), flash memory, hard disk drive (HDD), solid state drive (SSD), or similar components or a combination of the above components for storing multiple modules or various application programs executable by the processor 110. The storage medium 120 may store a plurality of machine learning model sets for correcting frames for different kinds of external devices, respectively.

In an embodiment, the storage medium 120 may store a machine learning model set 10 including a machine learning model 11, a machine learning model 12 and a machine learning model 13, and a machine learning model set 20 including a machine learning model 21, a machine learning model 22, and a machine learning model 23, but the present disclosure provides no limitation to the number of machine learning model sets in the storage medium 120. For example, the storage medium 120 may store N machine learning model sets, and N is any positive integer. The machine learning model set 10 and the machine learning model set 20 are respectively configured to correct frames for optical signals of different kinds of external devices. For example, if the machine learning model set 10 is configured to correct frames for the optical signal emitted by the set-top box, the machine learning model set 20 is configured to correct frames for the optical signal emitted by other external devices (e.g., remote controller), which is different from the set-top box.

The transceiver 130 transmits and receives signals in a wireless or wired manner. The transceiver 130 may further perform operations such as low noise amplification, impedance matching, frequency mixing, up or down frequency conversion, filtering, amplification, and the like.

The capturing device 140 may be a camera or a photographic device for capturing images (e.g., frames of optical signals). The capturing device 140 may include an image sensor such as a complementary metal oxide semiconductor (CMOS) sensor or a charge coupled device (CCD) sensor.

Figure 2:
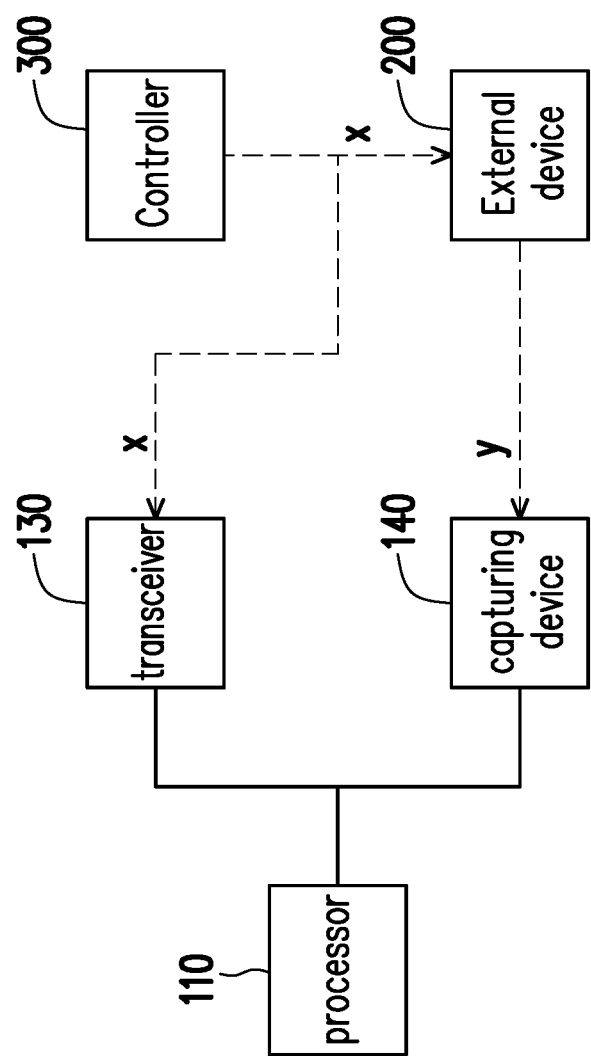
FIG. 2 shows a schematic view of obtaining training data for training a machine learning model according to an embodiment of the present disclosure.

FIG. 2 shows a schematic view of obtaining training data for training a machine learning model according to an embodiment of the present disclosure. It is assumed that the external device 200 is controlled by the controller 300 to emit optical signals. In order to train the machine learning model set 10 for correcting frames for the optical signal of the external device 200, the processor 110 of the electronic device 100 may receive the historical control signaling x including a plurality of historical timestamps from the controller 300 through the transceiver 130, and capture the historical optical signal y corresponding to the historical control signaling x from the external device 200 through the capturing device 140. The historical optical signal y may include a plurality of historical frames corresponding to a plurality of historical timestamps, respectively.

In an embodiment, the processor 110 may determine that the historical control signaling x matches the external device 200 and the historical optical signal y transmitted by the external device 200 according to the information related to the external device 200 in the historical control signaling x. For example, the historical control signaling x may include a product ID (PID), a manufacturer ID (MID), a unique identifier (UID), or a universally unique ID (UUID), and the other information associated with the external device 200. The processor 110 may determine that the captured historical optical signal y corresponds to the external device 200 according to the information.

After obtaining the historical control signaling x including a plurality of historical timestamps and the historical optical signal y including a plurality of historical frames, the processor 110 may train the machine learning model set 10 according to the historical control signaling x and the historical optical signal y. Specifically, the processor 110 may train the machine learning model 11 according to a plurality of historical timestamps in the historical control signaling x. The machine learning model 11 is, for example, a classification model or a cluster model, but the present disclosure provides no limitation to the machine learning algorithm configured to train the machine learning model 11. The trained machine learning model 11 may be configured to predict the time interval between different timestamps (or different frames) in the optical signal.

On the other hand, the processor 110 may train the machine learning model 12 or the machine learning model 13 according to a plurality of historical timestamps in the historical control signaling x and a plurality of historical frames in the historical optical signal y. The machine learning model 12 or the machine learning model 13 is, for example, a recurrent neural network model (RNN) or a generative model, but the present disclosure provides no limitation to the machine learning algorithms configured to train the machine learning model 12 or the machine learning model 13. The trained machine learning model 12 or machine learning model 13 may predict the frame to be generated based on one or more previously sampled frames.

Figure 3:
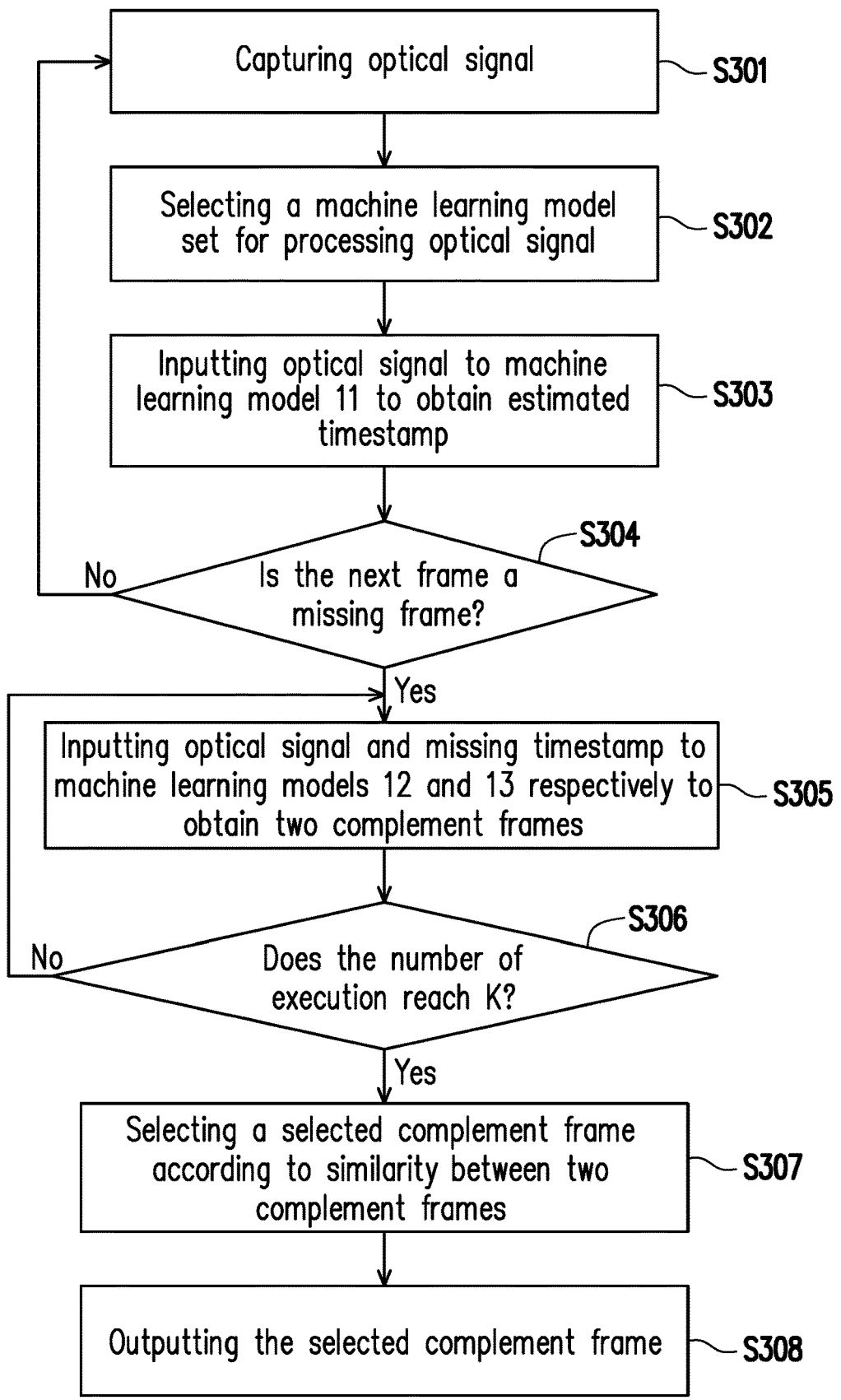
FIG. 3 is a flowchart of generating a complement frame according to an embodiment of the present disclosure.

After completing the training of the machine learning model set 10, the processor 110 may generate a complement frame for the optical signal emitted by the external device 200 according to the machine learning model set 10, so as to avoid optical signal distortion caused by floating sampling frame rate of the capturing device 140 or the asynchrony between the capturing device 140 and the external device 200. FIG. 3 is a flowchart of generating a complement frame according to an embodiment of the present disclosure. The process of FIG. 3 may be implemented by the electronic device 100 shown in FIG. 1.

In step S301, the processor 110 may capture the optical signal emitted by the external device 200 through the capturing device 140. The optical signal may include multiple timestamps and multiple frames corresponding to the multiple timestamps, respectively. The optical signal captured by the capturing device 140 may be lack of some information.

In step S302, the processor 110 may select a machine learning model set 10 for processing the optical signal from a plurality of machine learning model sets in the storage medium 120.

Figure 4:
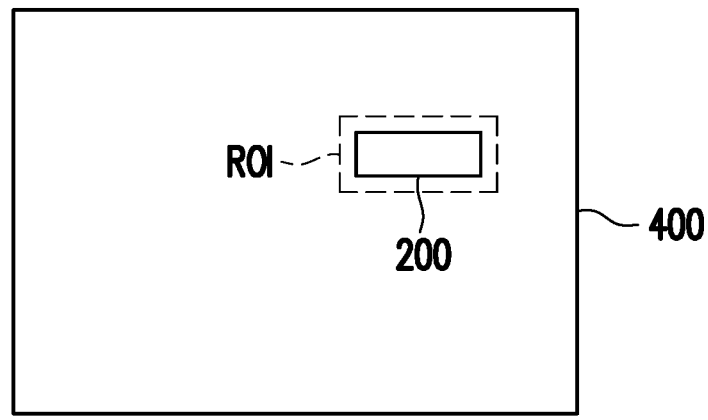
FIG. 4 is a schematic view illustrating a region of interest according to an embodiment of the present disclosure.

In an embodiment, the processor 110 may capture the image of the external device 200 that emits the optical signal through the capturing device 140, and may generate an identification result according to the image identification external device 200 based on an object detection algorithm. For example, the identification result may be generated based on the position and/or size of the external device 200, but not limited thereto. In this manner, the processor 110 may determine that the external device 200 is a set-top box according to the identification result. The processor 110 may further generate a region of interest (ROI) corresponding to the external device 200 according to the identification result. FIG. 4 is a schematic view illustrating a region of interest ROI according to an embodiment of the present disclosure.

After the processor 110 captures the image 400 including the external device 200, the processor 110 may perform object recognition on the image 400 to generate a region of interest ROI corresponding to the external device 200. In this way, when the optical signal from the region of interest ROI is received, the processor 110 may determine that the optical signal comes from the external device 200. Accordingly, the processor 110 may select a machine learning model set 10 for processing the optical signal of one or more external devices 200 (e.g., set-top box, remote controller, modem) from a plurality of machine learning model sets in the storage medium 120.

In an embodiment, the optical signal emitted by the external device 200 may include an optical codeword. The processor 110 may identify the external device 200 according to the optical codeword. The optical signal may contain a specific light signal, for example, the color of the light signal may be red, blue, green, or yellow, or flashing light signal that turns on or off with rhythm, such as 2 times of fast flashing light or 3 times of slow flashing light, and the disclosure is not limited thereto. The processor 110 may determine that one or more external devices are set-top boxes, remote controllers, and/or modems, etc. according to the specific light signals.

Figure 5:
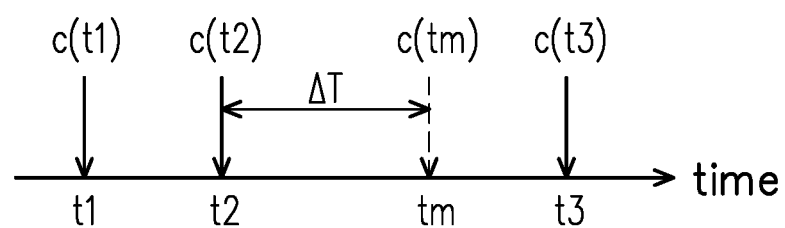
FIG. 5 is a schematic view illustrating a missing timestamp and a missing frame according to an embodiment of the present disclosure.

In step S303, the processor 110 may input the optical signal to the machine learning model 11 to obtain an estimated timestamp. FIG. 5 is a schematic view illustrating a missing timestamp and a missing frame according to an embodiment of the present disclosure. Assume that the optical signal includes a frame c(t1) corresponding to a timestamp t1, a frame c(t2) corresponding to a timestamp t2, and a frame c(t3) corresponding to a timestamp t3. The processor 110 may input one or more timestamps in the optical signal to the machine learning model 11, and the one or more timestamps may include the timestamp t2 and/or timestamps preceding the timestamp t2 (e.g., timestamp t1). The machine learning model 11 may generate the estimated time interval $\Delta T$ between the frame c(t2) and the next frame c(t2+$\Delta T$) according to the input information. The number of frames per second may be 1000 FPS (Frames per second), and the disclosure is not limited thereto. The processor 110 may calculate an estimated timestamp (t2+$\Delta T$) corresponding to the next frame c(t2+$\Delta T$) according to the estimated time interval $\Delta T$.

In step S304, the processor 110 may determine whether the next frame c(t2+$\Delta T$) is a missing frame c(tm) according to the estimated timestamp (t2+$\Delta T$). If the next frame c(t2+$\Delta T$) is the missing frame c(tm), proceed to step S305. If the next frame c(t2+$\Delta T$) is not the missing frame c(tm), proceed to step S301. In response to the next frame c(t2+$\Delta T$) being the missing frame c(tm), the processor 110 may determine that the estimated timestamp (t2+$\Delta T$) corresponding to the next frame c(t2+$\Delta T$) is the missing timestamp tm.

In an embodiment, the processor 110 may detect the optical signal according to the estimated timestamp (t2+$\Delta T$) to obtain the pixel value of the next frame c(t2+$\Delta T$), and may determine whether the next frame c(t2+$\Delta T$) is the missing frame c(tm) according to the pixel value. Equation (1) is an example of a method for determining whether the next frame c(t2+$\Delta T$) is a missing frame c(tm), and F[c(t2+$\Delta T$)] is the pixel value of the next frame c(t2+$\Delta T$). If F[c(t2+$\Delta T$)] is greater than or equal to the threshold H1, it means that the next frame c(t2+$\Delta T$) clearly displays the optical signal representing "1", so the processor 110 may determine that the next frame c(t2+$\Delta T$) corresponds to the signal "1". If F[c(t2+$\Delta T$)] is less than or equal to the threshold H2 (H2<H1), it means that the next frame c(t2+$\Delta T$) clearly displays the optical signal representing "0", so the processor 110 may determine that the next frame c(t2+$\Delta T$) corresponds to the signal "0". If F[c(t2+$\Delta T$)] is less than the threshold H1 and greater than the threshold H2, it means that the next frame c(t2+$\Delta T$) does not clearly display the optical signal, so the processor 110 may determine that the next frame c(t2+$\Delta T$)) is the missing frame c(tm).

$$\begin{cases} F[c(t2+\Delta T)] \geq H1,\ c(t2+\Delta T) = 1 \\ H1 > F[c(t2+\Delta T)] > H2,\ c(t2+\Delta T) = c(tm) \\ F[c(t2+\Delta T)] \leq H2,\ c(t2+\Delta T) = 0 \end{cases} \quad (1)$$

The processor 110 may repeatedly execute step S305 until the number of executions reaches a preset number of iterations K, and K is any positive integer. In step S305, the processor 110 may input the optical signal and the missing timestamp tm to the machine learning model 12 to obtain the complement frame $c(tm)_{12,k}$ corresponding to the missing timestamp tm, and may input the optical signal and the missing timestamp tm to the machine learning model 13 to obtain the complement frame $c(tm)_{13,k}$ corresponding to the missing timestamp tm, and k represents an iteration index. In other words, the processor 110 may obtain two complement frames. For example, if the processor 110 executes step S305 for the first time, the two complement frames generated by the machine learning model 12 and the machine learning model 13 may be the complement frame $c(tm)_{12,1}$ and the complement frame $c(tm)_{13,1}$ respectively. If the processor 110 executes step S305 for the last time, the two complement frames generated by the machine learning model 12 and the machine learning model 13 may be the complement frame $c(tm)_{12,k}$ and the complement frame $c(tm)_{13,k}$ respectively.

In step S306, the processor 110 may determine whether the number of executions of step S305 reaches a preset number of iterations K. If the number of executions has reached the preset number of iterations K, proceed to step S307. If the number of executions has not reached the preset number of iterations K, proceed to step S305.

In step S307, the processor 110 may calculate the similarity between the complement frame $c(tm)_{12,k}$ and the complement frame $c(tm)_{13,k}$, thereby generating K similarities [s(1) s(2) . . . s(K)] corresponding to K times of iterations. The processor 110 may select the optimal complement frame from the plurality of complement frames as the selected complement frame according to the K similarities. For example, the processor 110 may select the complement frame $c(tm)_{12,i}$ (or complement frame $c(tm)_{13,i}$) in response to the similarity s(i) being the highest similarity among the K similarities [s(1) s(2) . . . s(K)]. The higher similarity between the complement frames $c(tm)_{12,i}$ and $c(tm)_{13,i}$ means that the complement frames generated by the machine learning model 12 and the machine learning model 13 are similar and thus more reliable.

In step S308, the processor 110 may output the selected complement frame $c(tm)_{12,i}$ (or the complement frame $c(tm)_{13,i}$) through the transceiver 130. If the selected complement frame $c(tm)_{12,i}$ is added to the distorted optical signal captured by the capturing device 140, the distorted optical signal may be restored to a complete optical signal.

Figure 6:
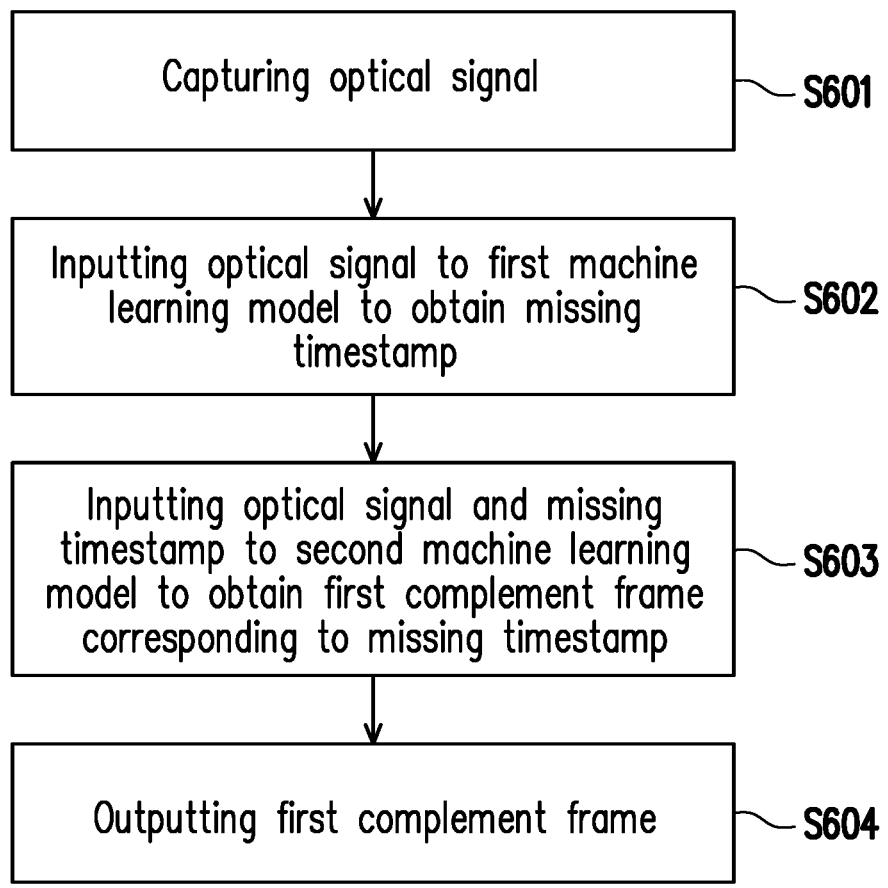
FIG. 6 is a flowchart illustrating a method of correcting frames for optical camera communication according to an embodiment of the present disclosure.

FIG. 6 is a flowchart illustrating a method of correcting frames for optical camera communication according to an embodiment of the present disclosure, and the method may be implemented by the electronic device 100 shown in FIG. 1. In step S601, the optical signal is captured. In step S602, the optical signal is input to the first machine learning model to obtain the missing timestamp. In step S603, the optical signal and the missing timestamp are input to the second machine learning model to obtain a first complement frame corresponding to the missing timestamp. In step S604, the first complement frame is output.

To sum up, the electronic device of the present disclosure may capture the optical signal emitted by the IoT device through the capturing device, and may utilize the machine learning technology to determine whether the optical signal is affected by the asynchrony between the IoT device and the camera and lacks a specific frame. If the electronic device determines that there are missing frames in the optical signal, the electronic device may utilize machine learning technology to generate complement frames to correct the missing frames. Compared with conventional frame interpolation techniques (such as frame averaging, motion estimation, or optical flow method), the present disclosure may adapt to OCC systems with fast light signal change, and may avoid losing important information in optical signals due to asynchrony problem.

What is claimed is:

1. An electronic device of correcting frames for optical camera communication, comprising:
   a transceiver;
   a capturing device, configured to capture an optical signal;
   a storage medium, configured to store a plurality of machine learning models comprising a first machine learning model and a second machine learning model; and
   a processor, coupled to the storage medium, the transceiver, and the capturing device, wherein the processor is configured to:
      input the optical signal to the first machine learning model to obtain a missing timestamp;
      input the optical signal and the missing timestamp to the second machine learning model to obtain a first complement frame corresponding to the missing timestamp; and
      output the first complement frame through the transceiver.

2. The electronic device according to claim 1, wherein the plurality of machine learning models further comprise a third machine learning model, wherein the processor is further configured to:
   input the optical signal and the missing timestamp to the third machine learning model to obtain a second complement frame corresponding to the missing timestamp; and
   determine to output the first complement frame according to a first similarity between the first complement frame and the second complement frame.

3. The electronic device according to claim 2, wherein the processor is further configured to:
   input the optical signal and the missing timestamp to the second machine learning model again to obtain a third complement frame corresponding to the missing timestamp;
   input the optical signal and the missing timestamp to the third machine learning model again to obtain a fourth complement frame corresponding to the missing timestamp; and
   select the first complement frame from the first complement frame and the third complement frame to output the first complement frame in response to the first similarity being higher than a second similarity between the third complement frame and the fourth complement frame.

4. The electronic device according to claim 1, wherein the processor is further configured to:
   identify an external device emitting the optical signal by the capturing device to generate an identification result; and
   select the first machine learning model and the second machine learning model corresponding to the external device from the plurality of machine learning models according to the identification result to generate the first complement frame.

5. The electronic device according to claim 4, wherein the optical signal comprises an optical codeword, wherein the processor identifies the external device according to the optical codeword.

6. The electronic device according to claim 4, wherein the capturing device captures an image comprising the external device, wherein the processor is configured to identify the external device according to the image based on an object detection algorithm.

7. The electronic device according to claim 4, wherein the processor is further configured to:
   generate a region of interest according to the identification result; and
   determine that the optical signal corresponds to the external device in response to the optical signal coming from the region of interest.

8. The electronic device according to claim 1, wherein the optical signal comprises a first frame corresponding to a first timestamp, wherein the processor is further configured to:
   input the optical signal to the first machine learning model to output an estimated time interval between the first frame and a next frame, and calculate an estimated timestamp corresponding to the next frame according to the first timestamp and the estimated time interval;
   detect the optical signal according to the estimated timestamp to obtain a pixel value of the next frame, and determine whether the next frame is a missing frame according to the pixel value;
   determine that the estimated timestamp is the missing timestamp in response to determining that the next frame is the missing frame; and
   input the first timestamp, the first frame, and the missing timestamp to the second machine learning model to output the first complement frame.

9. The electronic device according to claim 1, wherein the processor is further configured to:
   receive a historical control signaling by the transceiver, wherein the historical control signaling comprises a plurality of historical timestamps; and
   train the first machine learning model according to the plurality of historical timestamps.

10. The electronic device according to claim 1, wherein the processor is further configured to:
    receive a historical control signaling by the transceiver, wherein the historical control signaling comprises a plurality of historical timestamps;
    capture a historical optical signal by the capturing device corresponding to the historical control signaling, wherein the historical optical signal comprises a plurality of historical frames corresponding to the plurality of historical timestamps respectively; and
    train the second machine learning model according to the plurality of historical timestamps and the plurality of historical frames.

11. A method of correcting frames for optical camera communication, comprising:
- capturing an optical signal;
- inputting the optical signal to a first machine learning model to obtain a missing timestamp;
- inputting the optical signal and the missing timestamp to a second machine learning model to obtain a first complement frame corresponding to the missing timestamp; and
- outputting the first complement frame.

12. The method according to claim 11, wherein the step of outputting the first complement frame comprises:
- inputting the optical signal and the missing timestamp to a third machine learning model to obtain a second complement frame corresponding to the missing timestamp; and
- determining to output the first complement frame according to a first similarity between the first complement frame and the second complement frame.

13. The method according to claim 12, wherein the step of outputting the first complement frame further comprises:
- inputting the optical signal and the missing timestamp to the second machine learning model again to obtain a third complement frame corresponding to the missing timestamp;
- inputting the optical signal and the missing timestamp to the third machine learning model again to obtain a fourth complement frame corresponding to the missing timestamp; and
- selecting the first complement frame from the first complement frame and the third complement frame to output the first complement frame in response to the first similarity being higher than a second similarity between the third complement frame and the fourth complement frame.

14. The method according to claim 11, wherein the step of inputting the optical signal and the missing timestamp to the second machine learning model to obtain the first complement frame corresponding to the missing timestamp comprises:
- identifying an external device emitting the optical signal to generate an identification result; and
- selecting the first machine learning model and the second machine learning model corresponding to the external device from a plurality of machine learning models according to the identification result to generate the first complement frame.

15. The method according to claim 14, wherein the step of identifying the external device emitting the optical signal to generate the identification result comprises:
- identifying the external device according to an optical codeword in the optical signal.

16. The method according to claim 14, wherein the step of identifying the external device emitting the optical signal to generate the identification result comprises:
- capturing an image comprising the external device; and
- identifying the external device according to the image based on an object detection algorithm.

17. The method according to claim 14, wherein the step of identifying the external device emitting the optical signal to generate the identification result comprises:
- generating a region of interest according to the identification result; and
- determining that the optical signal corresponds to the external device in response to the optical signal coming from the region of interest.

18. The method according to claim 11, wherein the optical signal comprises a first frame corresponding to a first timestamp, wherein the step of inputting the optical signal to the first machine learning model to obtain the missing timestamp comprises:
- inputting the optical signal to the first machine learning model to output an estimated time interval between the first frame and a next frame, and calculating an estimated timestamp corresponding to the next frame according to the first timestamp and the estimated time interval;
- detecting the optical signal according to the estimated timestamp to obtain a pixel value of the next frame, and determining whether the next frame is a missing frame according to the pixel value;
- determining that the estimated timestamp is the missing timestamp in response to determining that the next frame is the missing frame,
- wherein the step of inputting the optical signal and the missing timestamp to the second machine learning model to obtain the first complement frame corresponding to the missing timestamp comprises:
- inputting the first timestamp, the first frame, and the missing timestamp to the second machine learning model to output the first complement frame.

19. The method according to claim 11, further comprising:
- receiving a historical control signaling, wherein the historical control signaling comprises a plurality of historical timestamps; and
- training the first machine learning model according to the plurality of historical timestamps.

20. The method according to claim 11, further comprising:
- receiving a historical control signaling, wherein the historical control signaling comprises a plurality of historical timestamps;
- capturing a historical optical signal corresponding to the historical control signaling, wherein the historical optical signal comprises a plurality of historical frames corresponding to the plurality of historical timestamps respectively; and
- training the second machine learning model according to the plurality of historical timestamps and the plurality of historical frames.

* * * * *